US012101273B2

(12) United States Patent
Lin (10) Patent No.: US 12,101,273 B2
(45) Date of Patent: Sep. 24, 2024

(54) METHOD FOR CONTROL CHANNEL DETECTION IN WIDEBAND OPERATION

(71) Applicant: GUANGDONG OPPO MOBILE TELECOMMUNICATIONS CORP., LTD., Guangdong (CN)

(72) Inventor: Hao Lin, Neuilly sur Seine (FR)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 372 days.

(21) Appl. No.: 17/559,644

(22) Filed: Dec. 22, 2021

(65) Prior Publication Data

US 2022/0116181 A1    Apr. 14, 2022

Related U.S. Application Data

(63) Continuation of application No. PCT/IB2019/001094, filed on Sep. 30, 2019.

(30) Foreign Application Priority Data

Sep. 9, 2019   (WO) ................. PCT/FR2019/052075

(51) Int. Cl.
*H04W 56/00* (2009.01)
*H04L 5/00* (2006.01)
*H04W 74/0808* (2024.01)

(52) U.S. Cl.
CPC .......... *H04L 5/0053* (2013.01); *H04L 5/0046* (2013.01); *H04L 5/0094* (2013.01); *H04L 5/0098* (2013.01); *H04W 74/0808* (2013.01)

(58) Field of Classification Search
CPC ................ H04L 5/0053; H04L 5/0046; H04L 5/0094; H04L 5/0098; H04W 74/0808
(Continued)

(56) References Cited

U.S. PATENT DOCUMENTS

2019/0274032 A1   9/2019  Chatterjee et al.
2019/0349142 A1   11/2019  Aiba et al.
(Continued)

FOREIGN PATENT DOCUMENTS

EP      3641438 A1    4/2020
WO   2018228529 A1    12/2018
(Continued)

OTHER PUBLICATIONS

"Zhang et al., Communication Method, Device and System, Jul. 4, 2019, WO 201912914" (Year: 2018).*
(Continued)

*Primary Examiner* — Sai Ming Chan
(74) *Attorney, Agent, or Firm* — Ladas & Parry LLP (57) ABSTRACT

A method for control channel transmission, comprising: configuring at least one search space group (SSG) containing at least two different search space sets; configuring at least one control resource set (CORESET) confined within one subband among the plurality of subbands; associating said at least one SSG with said at least one CORESET, the associated CORESET becoming a reference CORESET; associating the reference CORESET and at least one frequency shifted CORESET of the reference CORESET confined within at least another subband among the plurality of subbands, with said at least two different search space sets; the reference CORESET and the at least one frequency shifted CORESET sharing the same CORESET index; performing a listen before talk procedure over each subband of the plurality of subbands to detect available subbands; transmitting, within available subbands, a control channel within the reference CORESET and the at least one frequency shifted CORESET.

20 Claims, 3 Drawing Sheets

(58) Field of Classification Search
USPC .......................................................... 370/329
See application file for complete search history.

(56) References Cited

U.S. PATENT DOCUMENTS

2020/0120720 A1* 4/2020 Wu ....................... H04W 72/04
2020/0404669 A1 12/2020 Seo et al.

FOREIGN PATENT DOCUMENTS

| WO | 2018229951 A1 | 12/2018 |
|---|---|---|
| WO | 2019129014 A1 | 7/2019 |

OTHER PUBLICATIONS

Takeda et al., User Terminal and Wireless Communication Method, Dec. 20, 2018, WO 201829951 (Year: 2017).*

International Search Report (ISR) dated Jun. 9, 2020 for Application No. PCT/IB2019/001094.

LG Electronics: "Physical layer design of DL signals and channels for NR-U", 3GPP Draft; R1-1900604, 3rd Generation Partnership Project (3GPP), Mobile Competence Centre; 650, Route Des Lucioles; F-06921 Sophia-Antipolis Cedex; France vol. RAN WG1, no. Taipei, Taiwan; Jan. 21, 2019-Jan. 25, 2019 Jan. 20, 2019(Jan. 20, 2019), XP051593451.

International Search Report (ISR) and Written Opinion dated Jun. 4, 2020 for Application No. PCT/IB2019/001174.

LG Electronics: "Summary on wide-band operation for NR-U", 3GPP Draft; R1-1909458, 3rd Generation Partnership Project (3GPP), Mobile Competence Centre; 650, Route Des Lucioles; F-06921 Sophia-Antipolis Cedex; France, vol. RAN WG1, no. Prague, CZ; Aug. 26, 2019-Aug. 30, 2019 Sep. 3, 2019(Sep. 3, 2019), XP051766064.

The Notice of Allowance of corresponding American U.S. Appl. No. 17/561,611, dated May 3, 2024.

* cited by examiner

METHOD FOR CONTROL CHANNEL DETECTION IN WIDEBAND OPERATION

CROSS-REFERENCE TO RELATED APPLICATIONS

This application is a continuation of International Application No. PCT/IB2019/001094 filed on Sep. 30, 2019, which claims priority to International Application No. PCT/FR2019/052075, filed on Sep. 9, 2019, and both of the aforementioned applications are incorporated herein by reference in their entireties.

TECHNICAL FIELD

The present disclosure relates to the field of communication technologies, and in particular, to a method for control channel transmission and detection in wideband operation, between a base station (BS) and a user equipment (UE).

The communication technology is for example a 5G (fifth generation) network using the 5G NR (New Radio) as radio access technology (RAT) defined by 3GPP. The present disclosure is applicable to 5G NR-U (NR in unlicensed spectrum), but also to 5G NR (NR in licensed spectrum).

BACKGROUND

According to the NR specification Release 15 (NR R15), the UE detects the physical downlink control channel (PDCCH) via checking the PDCCH candidates within its corresponding control-resource set (CORESET) based on the control-channel element (CCE) index.

CORESET

Figure 1:
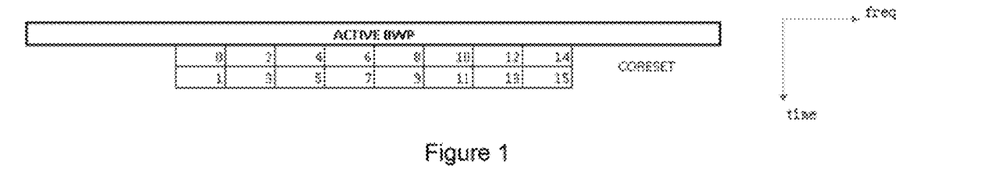
FIG. 1 shows an example of a CORESET configuration.

In NR specification, the CORESET defines the time frequency resources for the BS to transmit the control signal. In frequency domain the CORESET is defined as a multiple of 6 resource blocks (RB) within the bandwidth part (BWP). Thus the CORESET bandwidth can go beyond the BWP. In time domain, the CORESET can be configured to have 1, 2 or 3 OFDM symbols. In the example of FIG. 1, a CORESET is configured within BWP with a frequency bandwidth of 9×6=54 RB and a time duration of 2 OFDM symbols.

Search Space Set

The CORESET defines the time-frequency resources for a BS to transmit the control channel. The search space set defines the monitoring occasion, which is equivalent to the concrete time location where the BS can send the control channel in the CORESET. The search space set is linked to CORESET and additionally provides a periodicity (in slot) and a time location (in symbol). One example is given in FIG. 2, a search space is associated with a CORESET which has two OFDM symbols. The search space set configures the monitoring occasion once every two slots and starts from slot 0. Thus the monitoring slots are slot 0, 2, 4, . . . .

Figure 2:
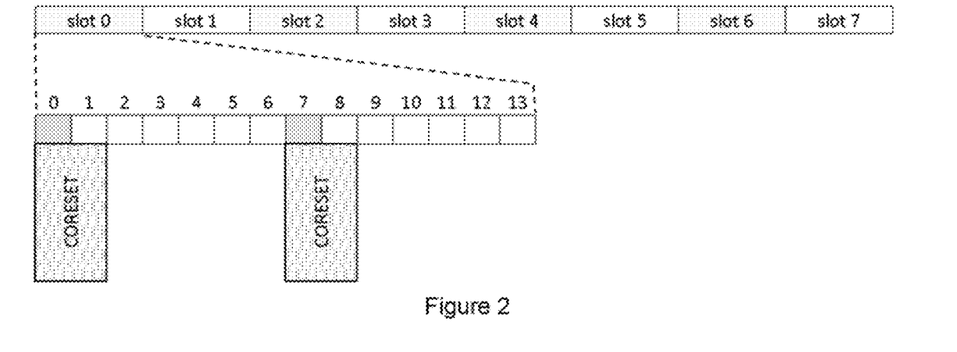
FIG. 2 shows an example of a search space set associated with a CORESET.

Moreover, in the monitoring slots, the search space set further configures that the monitoring starting symbols are at symbol indexes 0 and 7. Thus, the possible resources for the BS to send the control channels are the time-frequency resources configured in CORESET which appear only in the monitoring slot, in which it starts at symbol indexes 0 and 7.

PDCCH Candidate and Aggregation Level

With all the time-frequency resources in a CORESET, the resources can be divided into partitions, each partition will contain a PDCCH candidate. The number of the partitions, aka PDCCH candidates can be configured by the BS in the search space. The aggregation level is highly related to the partition size. There are multiple level can be configured, i.e. AL=1, 2, 4, 8, 16. Larger AL corresponds to larger size of partition, i.e. more resources in one partition but less partitions in one CORESET. Thus, for a given CORESET, large AL value means less PDCCH candidates but each PDCCH candidate has better reliability; while small AL value means more PDCCH candidates, but each PDCCH candidate has lower reliability. PDCCH candidate and AL are configured also in search space. Typically, multiple AL values can be configured within the same search space; and the PDCCH candidate number is associated with each AL.

Unlicensed Band

The unlicensed spectrum is a shared spectrum. The communication equipment in different communication systems can use the spectrum as long as it meets the regulatory requirements set by the country or region on the spectrum, and does not need to apply for a proprietary spectrum authorization from the government.

In order to allow various communication systems that use unlicensed spectrum for wireless communication to coexist friendly in the spectrum, some countries or regions specify regulatory requirements that must be met to use unlicensed spectrum. For example, the communication device follows the principle of "Listen Before Talk (LBT)", that is, the device needs to perform channel sensing before transmitting the signal on the channel. Only when the LBT outcome shows that the channel is idle, the device can perform signal transmission; otherwise, the device cannot perform signal transmission. In order to ensure fairness, once a device successfully occupies the channel, the transmission duration cannot exceed the Maximum Channel Occupancy Time (MCOT).

Wideband Operation in Unlicensed Band

Figure 3A:
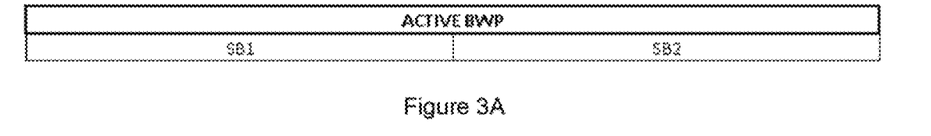
FIG. 3A shows a configuration with an active BWP which contains multiple subbands and FIG. 3B shows a partial transmission within the active BWP.
Figure 3B:
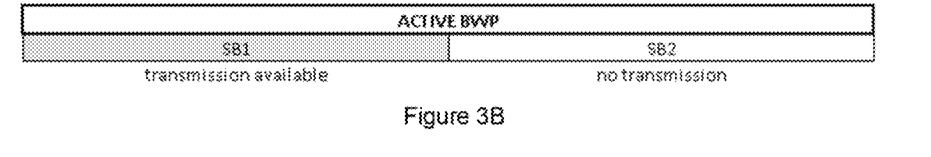

In NR-U wide-band operation, BS and UE can operate in a wider band which consists of multiple subbands (SBs). As defined in NR specification, bandwidth part (BWP) is a subset of contiguous common resource blocks on a given carrier. Thus in the context of NR-U wide-band operation, a UE can be configured with an active BWP which contains multiple subbands, as shown in FIG. 3A. However, by regulation, prior to each transmission in the SB, the sender (i.e. BS) needs to perform a Listen-before-Talk (LBT) procedure. This implies that for multiple SB transmissions, SB-based LBT has to be performed. Since the outcome of the multi-SB LBT cannot be uniform, partial transmission within the active BWP will become a common case as shown in FIG. 3B.

Therefore, the question becomes how to design the CORESET to support such partial transmission case.

SUMMARY

A first object of the present disclosure is a method for control channel transmission in wideband operation performed in a base station, comprising the steps of:
  configuring at least one search space group (SSG) containing at least two different search space sets;
  configuring at least one control resource set (CORESET) confined within one subband among the plurality of subbands;
  associating said at least one SSG with said at least one CORESET, the associated CORESET becoming a reference CORESET;
  associating the reference CORESET and at least one frequency shifted CORESET of the reference CORESET confined within at least another subband among the plurality of subbands, with said at least two different search space sets; the reference CORESET and the at least one frequency shifted CORESET sharing the same CORESET index;

performing a listen before talk (LBT) procedure over each subband of the plurality of subbands to detect available subbands;

transmitting, within available subbands, a control channel within the reference CORESET and the at least one frequency shifted CORESET.

Such method allows the base station to realize control channel transmission in wideband operation without increasing the number of CORESET per bandwidth part thanks to the ability to transmit the control channel within in one CORESET in several subbands by using a search space group containing several search space sets. By confining each CORESET (reference and shifted ones) within one respective subband, it ensures that any unavailable subband will not prevent transmitting the control channel within CORESET in another subband as it would be the case with CORESET covering multiple subbands. By using frequency shifted CORESET, it also does not impair the number of usable CORESET per bandwidth part. Moreover, the method ensures that control channel transmission is performed in available subbands.

Advantageously, the at least one frequency shifted CORESET is also time shifted and wherein the reference CORESET and the at least one frequency and time shifted CORESET shares the same CORESET index. Further preferably, each search space set of the SSG configures monitoring occasion with a slot periodicity defining monitoring slots and at least one time location defining at least one monitoring starting time within said monitoring slots.

Mixing both frequency and time shifted CORESET provides more opportunity to transmit the control channel not only in different subbands but also at different time locations within monitoring slots.

Advantageously, during the search space set configuration, an explicit indication of the CORESET frequency shift is provided. Alternatively, during the search space set configuration, an implicit indication of the CORESET frequency shift is provided using a pre-defined index ordering of the different search space sets within said at least one search space group.

Using an explicit indication of the CORESET frequency shift allows the user equipment to detect, through the search space configuration, the frequency shift with respect to the reference CORESET to be performed for monitoring occasion in the next subband. Implicit indication is also possible and it reduces data transmission. For implicit indication, it needs configuration of a starting frequency, i.e. the one containing the reference CORESET, and then automatically switching to monitoring occasion in the next subband according to a pre-determined search space index ordering.

Advantageously, the method further comprises the step of either configuring, when more than one subband is available, a restriction to one available subband containing the configured reference CORESET or one frequency shifted CORESET of the reference CORESET associated with the configured at least one search space group; or configuring, when more than one subband is available, a restriction to at least one part of the configured reference CORESET or one frequency shifted CORESET of the reference CORESET associated with the configured at least one search space group.

Advantageously, the CORESET are based on the control-channel element (CCE) index and a valid search space set is defined as a search space set which corresponding CORE-SET is in an available subband, and the method further comprises the step of configuring, when the total number of CCE of the corresponding CORESET of valid search space sets exceeds a pre-defined threshold, to switch off some CCE from being monitored.

Advantageously, the method further comprises the step of either explicitly configuring the restriction through a Radio Resource Control (RRC) configuration; or implicitly configuring the switch off from one pre-defined CCE index.

Advantageously, the method further comprises the step of signalling the available subbands via an explicit indication within a control signal (GC-PDCCH). Alternatively, the method further comprises the step of signalling the available subbands via an implicit indication through transmission of a pre-known signal (DMRS).

Both alternatives allow the user equipment to receive the information about the available subbands. Then the user equipment will switch from one subband to the next available subband following the explicit or implicit indication for the CORESET frequency shift.

A second object of the present disclosure is a method for control channel detection in wideband operation performed in a user equipment (UE), comprising the steps of:

monitoring at least one search space group associated with a reference CORESET confined in one subband among the plurality of subbands and containing at least two search space sets, by:

monitoring, within said one subband, one search space set of the SSG containing the reference CORESET and monitoring, within at least another subband, the at least another search space set of the SSG containing at least one frequency shifted CORESET of the reference CORESET confined in the at least another subband among the plurality of subbands;

the reference CORESET and the at least one frequency shifted CORESET sharing the same CORESET index (CORESET_ID 1);

ignoring search space sets within unavailable subbands among the plurality of subbands after a listen before talk procedure has been performed by a base station over each subband of the wideband; and detecting a control channel within the reference CORE-SET or the at least one frequency shifted CORESET.

Such method allows the user equipment to realize control channel detection in wideband operation without increasing the number of CORESET per bandwidth part thanks to the ability to detect the control channel within in one CORESET in several subbands by using a search space group containing several search space sets. By confining each CORESET (reference and shifted ones) within one respective subband, it ensures that any unavailable subband will not prevent detecting the control channel within CORESET in another subband as it would be the case with CORESET covering multiple subbands. By using frequency shifted CORESET, it also does not impair the number of usable CORESET per bandwidth part. Moreover, the method ensures that control channel detection is only performed in available subbands.

Advantageously, the at least one frequency shifted CORESET is also time shifted and wherein the reference CORESET and the at least one frequency and time shifted CORESET shares the same CORESET index. Further preferably, each search space set of the SSG configures monitoring occasion with a slot periodicity defining monitoring slots and at least one time location defining at least one monitoring starting time within said monitoring slots.

Advantageously, the method further comprises a step of detecting an explicit indication of the CORESET frequency shift. Alternatively, the method comprises a step of detecting an implicit indication of the CORESET frequency shift using a pre-defined index ordering of the different search space sets within said at least one search space group.

Advantageously, the method comprises the step of detecting available subbands via an explicit indication within a control signal (GC-PDCCH). Alternatively, the method comprises the step of detecting available subbands via an implicit indication through a transmission of a pre-known signal (DMRS).

Advantageously, a valid search space set is defined as a search space set which corresponding CORESET is in an available subband, and the method further comprises the step of selecting one SSG containing at least one valid search space set.

Such method ensures efficient detection of the control channel through monitoring occasion being only performed in available subbands and selecting one SSG containing at least one valid search space set.

Advantageously, the selected SSG contains multiple valid search space sets, and the method comprises the step of either selecting one valid search space set from the valid search space sets; or selecting at least one part of the valid search space sets.

Advantageously, the method comprises the step of detecting the selected valid search space set(s) either through an explicit indication in the RRC configuration or through an implicit indication of a pre-defined CCE index value.

Advantageously, the base station configures a number of control channel candidates within each search space set of the SSG and the method comprises the step of selecting within the valid search spaces, only search spaces which have monitoring occasion in a current slot, if the number of control channel candidates exceed a pre-defined maximum number within each valid search space set.

Such method allows to reduce the total number of control channel candidates that are searched and therefore be compatible with any pre-defined maximum number of candidates.

Advantageously, the base station configures a number of control channel candidates within each search space set of the SSG and the CORESET are based on the control-channel element (CCE) index, the method comprises the step of selecting the CCEs within each of the corresponding CORESET to the valid search spaces having monitoring occasion in a current slot, if the number of non-overlapped CCEs exceeds a pre-defined maximum number.

Advantageously, the number of control channel candidates within each search space set is based on at least one aggregation level of control channel elements, and the method comprises the step of further selecting search spaces set by removing the largest aggregation level value and its corresponding control channel candidates for each search space set with more than one aggregation level value. More preferably, the method further comprises the step of further reducing the number of control channel candidates by picking only one valid search space with a number of control channel candidates lower than the pre-defined maximum number of candidates or by dividing the number of candidates for each search space by an integer value.

Such method allows to further reduce the total number of control channel candidates. These above steps would be particularly important in a crowdy environment, meaning an environment where many devices (BS and UE) are present around.

A third object of the present disclosure is a base station in a mobile telecommunication network, comprising a module for connecting a user equipment to the mobile telecommunication system, configured to control the execution of the method for control channel transmission defined in the first object.

A fourth object of the present disclosure is a user equipment comprising a module for connecting to a mobile telecommunication system, configured to control the execution of the method for control channel detection defined in the second object.

A fifth object of the present disclosure is a computer readable medium comprising program instructions for causing a user equipment to perform the steps of a method according to the second object.

A sixth object of the present disclosure is a computer readable medium comprising program instructions for causing a base station to perform the steps of a method according to the first object.

BRIEF DESCRIPTION OF DRAWINGS

The appended drawings required in description of embodiments or the prior art will be briefly described below.

DESCRIPTION OF EMBODIMENTS

In the following disclosure, we present an example of a method that allows the base station (BS) realizing wideband control channel transmission in wideband operation without increasing the number of CORESET per bandwidth part (BWP).

Figure 4:
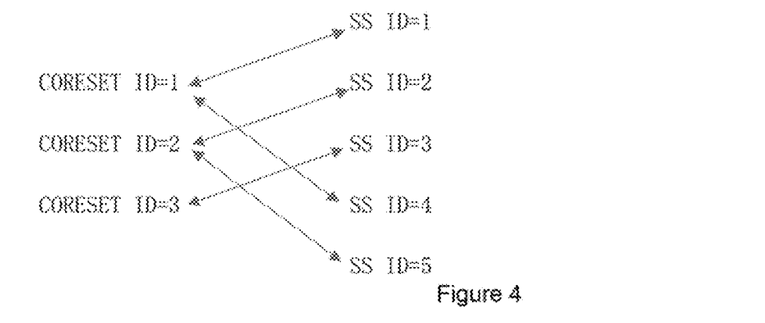
FIG. 4 shows the association between CORESET and search space sets.

In NR R15, the search space is associated with the CORESET via the association between the search space index (ID) and CORESET index (ID). FIG. 4 shows one example of the association between CORESET and search space sets. In this example different CORESET_ID are associated with different search space set ID as shown in the Table 1 below:

TABLE 1

| | | |
|---|---|---|
| CORESET ID = 1 | associated with | SS ID = 1 and SS ID = 4 |
| CORESET ID = 2 | | SS ID = 2 and SS ID = 5 |
| CORESET ID = 3 | | SS ID = 3 |

In the present disclosure, we introduce a search space group (SSG), which is more particularly configured for wideband operation. In the following example, we assume a wideband operation with three subbands. Of course, it also applies to wideband operation with two or more subbands.

We associate the CORESET with the search space group. One search space group contains two or more search space sets.

Figure 5:
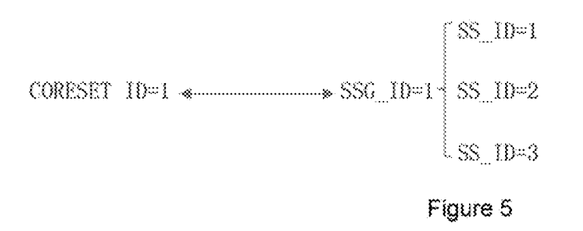
FIG. 5 shows the association between CORESET and a search space group.

In the example given in FIG. 5, within the search space group, we have three individual search space sets, associated with a CORESET as shown in the Table 2 below:

TABLE 2

| CORESET ID = 1 | associated with | SSG ID = 1 | Containing | SS ID = 1 |
| | | | | SS ID = 2 |
| | | | | SS ID = 3 |

Of course, depending on the number of search space sets available, it is possible to configure several SSG, each SSG being associated with one CORESET. An example is shown in the Table 3 below:

TABLE 3

| CORESET ID = 1 | associated with | SSG ID = 1 | Containing | SS ID = 1 |
| | | | | SS ID = 2 |
| | | | | SS ID = 3 |
| CORESET ID = 2 | associated with | SSG ID = 2 | Containing | SS ID = 4 |
| | | | | SS ID = 5 |

Figure 6A:
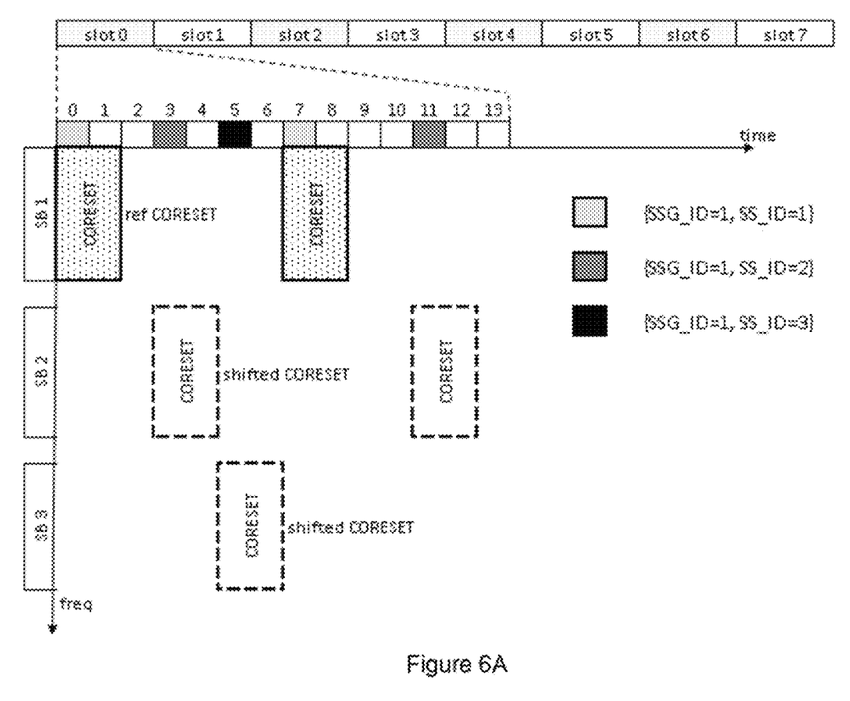
FIG. 6A shows a configuration a frequency and time shifted CORESET in multiple subbands.

Turning now to FIG. 6A, referring back to the example of Table 2, the CORESET index 1 (CORESET_ID=1) associated with the search space group index 1 (SSG_ID=1) is called reference CORESET, which, similar to NR R15, has specific time-frequency resources. Here the reference CORESET is configured to be fully confined within 1 subband that will be checked by the BS when performing Listen Before Talk (LBT) procedure. Then it is further associated with the individual search space sets (SS_ID={1, 2, 3} within the search space group index. The time frequency resources will be shifted in frequency domain or both in frequency and time domains.

In a wideband system with three LBT subbands (SB1, SB2, SB3), the BS configures CORESET_ID 1 to be associated with a search space group, i.e. SSG_ID 1, in which there are 3 search space set indexes, i.e. SS_ID 1, SS_ID 2, SS_ID 3. These three search space sets belong to the same search space group which is associated with the CORESET. Each of the search space set has its own monitoring occasions and control channel candidate (PDCCH) numbers together with the aggregation level (AL) values.

The CORESET defines the time-frequency resources for a BS to transmit the control channel. The search space group defines the monitoring occasion, which is equivalent to the concrete time location where the BS can send the control channel in the CORESET. The search space group is linked to CORESET and additionally provides for each search space set a periodicity (in slot) and a time location (in symbol).

In FIG. 6A, each search space set of the same search space group SSG_ID 1 is associated with the same CORESET which has two OFDM symbols in the example. Each search space set configures the monitoring occasion once every two slots and starts from slot 0. Thus the monitoring slots are slot 0, 2, 4, . . . for each search space sets SS_ID 1, SS_ID 2, SS_ID 3.

However, of course any other configuration is also possible such as the example given in Table 4 below:

TABLE 4

| SSG_ID 1 | Monitoring occasion | Active slots |
| --- | --- | --- |
| SS_ID 1 | Every 2 slots from 0 | 0, 2, 4, . . . |
| SS_ID 2 | Every 3 slots from 1 | 1, 4, 7, . . . |
| SS_ID 3 | Every 3 slots from 0 | 0, 3, 6, . . . |

It means that monitoring occasion will occur in slot 0 for both SS_ID 1 and SS_ID 3, in slot 1 for SS_ID 2 only, in slot 2 for SS_ID 1 only, in slot 3 for SS_ID 3 only, in slot 4 for SS_ID 1 and SS_ID 2, etc.

Going back to FIG. 6A, in the monitoring slots (0, 2, 4, . . . ), each search space set further configures the monitoring starting symbols which are in the example at symbol indexes 0 and 7 for SS_ID 1, at symbol indexes 3 and 11 for SS_ID 2, and at symbol index 5 for SS_ID 3. Thus, the possible resources for the BS to send the control channels are the time-frequency resources configured in CORESET_ID 1 which appear only in the monitoring slots, in which it starts at the defined symbol indexes.

Figure 6B:
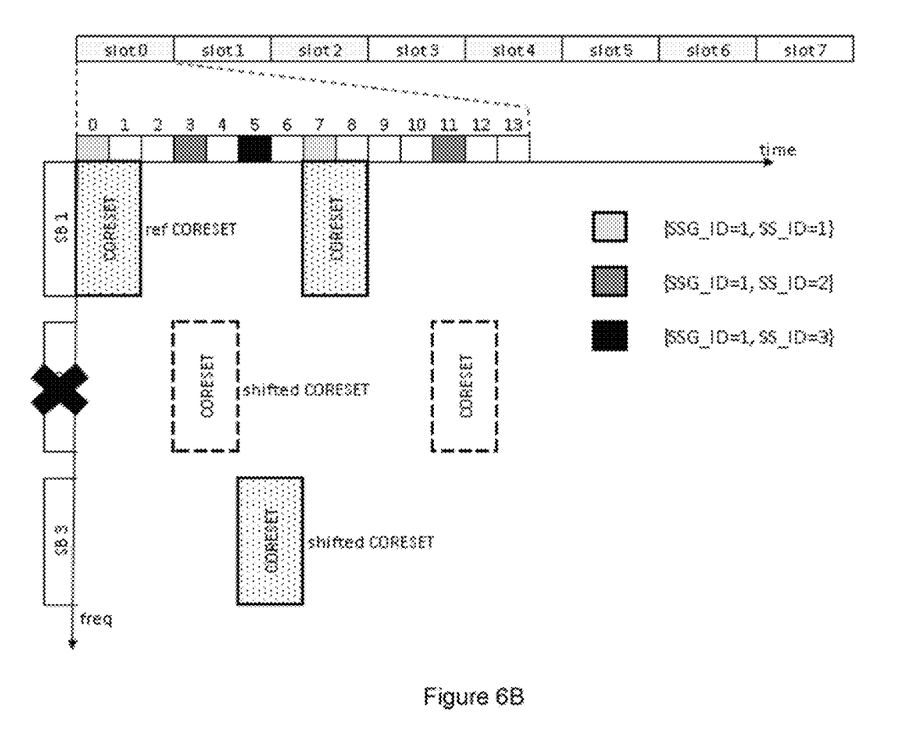
FIG. 6B shows the configuration of FIG. 6A after performing a LBT procedure.

After performing LBT procedure, the BS will detect unavailable subbands. In FIG. 6B, subband SB2 is not available and therefore cannot serve to transmit the control channel.

Example 1

Each of the search space has an explicit subband shift indication, e.g. shift the reference CORESET from the original subband index n to subband index n+i. In the figure, if the reference CORESET is configured in subband index 1 (SB1), then for SS_ID=1, the shift value i=0; SS_ID=2, with i=1; SS_ID=3, with i=2.

Before the UE receives the explicit LBT subband availability indication, e.g. via GC-PDCCH signal (i.e. Group-Common Physical Downlink Control Channel), the UE monitors all search spaces in the search space group. When the UE receives the LBT subband availability indication from the BS, it mutes the search space if its corresponding shifted CORESET falls in the unavailable LBT subband.

Example 2

Each of the search space does not have an explicit subband shift indication, but the shift version is implicitly interpreted by the search space index, e.g. ordering of the search space index. From the smallest index reflecting no shift w.r.t. the reference CORESET; and the second smallest index reflecting shift by 1 subband, and so on.

Before the UE receives the implicit LBT subband availability indication, e.g. via DMRS signal (Demodulation Reference Signal), the UE monitors all search spaces in the search space group. When the UE receives the LBT subband availability indication from the BS, it mutes the search space if its corresponding shifted CORESET falls in the unavailable LBT subband.

Example 3

A valid search space set is defined as a search space set which corresponding CORESET is in an available subband. Assuming $N_{SS}^{SSG}$ is the number of valid search spaces in a search space group, the validation of the search space within a search space group is explained in example 1 and 2. $N_{AL}^{SS\_ID}$ is the number of different aggregation levels configured in each valid search space index. f(i,j) is a counter which counts the number of PDCCH candidates for aggregation level j within search space index i. At some point of time, the number of the aggregated number of PDCCH candidates may exceed the max number supported by the UE. UE will then do the following selections:
while $$\sum_{i=1}^{N_{SS}^{SSG}} \sum_{j=1}^{N_{AL}^{SS\_ID}} f(i, j) > T,$$

for i=1: $N_{SS}^{SSG}$, switch off the last AL value and its corresponding PDCCH candidates.

Example 4

After the BS performed LBT for each of the subband, when multiple subbands are available for transmission, the BS can configure the UE to monitor only one of the available subbands instead of monitoring all the available subbands. According to an optional configuration based on an agreed rule, once the SB availability is known by the UE, the UE will only select one or a part of the valid search spaces, e.g., selecting the smallest SS_ID from all the valid SS_IDs. Of course this optional configuration can be enabled or disabled by the BS in the Radio Resource Control (RRC) configuration.

Example 5

As already defined, a valid search space set is defined as a search space set which corresponding CORESET is in an available subband. If in a search space group, there are multiple valid search space sets which are not switched off, all their corresponding CORESETs will fall in different subbands. Assuming in a given slot, the UE monitoring occasions of these multiple valid search space sets fall in the same slot. Then, the total number of CCEs of these corresponding CORESETs of valid search space sets may exceed a pre-defined threshold. In such a case, the UE may be configured to switch off some CCEs from being monitored. One implementation can be that the UE will switch off the same amount of the CCEs from the CORESETs, which are associated with the valid search spaces that belong to the same SSG, in each of the available subbands in the order from the largest CCE index to the lowest CCE index until the total number of CCEs falls below the pre-defined threshold. Of course, other mechanism to reduce the number of candidates can be implemented.

LIST OF ABBREVIATIONS IN THE DESCRIPTION AND DRAWINGS

| Acronyms | Full name |
| --- | --- |
| LTE | Long Term Evolution |
| LTE-A | Advanced long term evolution |
| NR | New Radio |
| NR-U | New Radio-unlicensed |
| eNB | Evolutional Node B |
| UE | User Equipment |
| PDCCH | Physical Downlink Control CHannel |
| PDSCH | Physical Downlink Shared CHannel |
| REG | Resource Element Group |
| SSB | SS/PBCH block |
| SSG | Search Space group |
| SS | Search Space |
| CORESET | Control Resource Set |
| DMRS | DeModulation Reference Signal |
| DCI | Downlink control information |
| SB | Subband |
| LBT | Listen Before Talk |
| CCE | Control Channel Element |
| COT | Channel Occupancy Time |
| MCOT | Maximum Channel Occupancy Time |
| RRC | Radio Resource Control |

In the above description, the mobile telecommunication system is a 5G mobile network comprising a 5G NR access network. The present example embodiment is applicable to NR in unlicensed spectrum (NR-U) and also to NR in licensed spectrum (NR). The present disclosure can be applied to other mobile networks, in particular to mobile network of any further generation cellular network technology (6G, etc.).

The above is only a specific implementation manner of the present disclosure, the protection scope of the present disclosure is not limited thereto, and changes or substitutions that can easily be thought of by those skilled in the art within the technical scope disclosed in the present disclosure should be covered by the protection scope of the present disclosure. Therefore, the protection scope of the present disclosure should be subject to the protection scope of the claims.

The various embodiments/examples, aspects and features, if any, described in this specification that do not fall under the scope of the independent claims are to be interpreted as examples useful for understanding various embodiments of the disclosure.

What is claimed is:

1. A method for control channel transmission in wideband operation containing a plurality of subbands performed in a base station (BS), comprising the steps of:
   configuring at least one search space group (SSG) containing at least two different search space sets;
   configuring at least one control resource set (CORESET) confined within one subband (SB1) among the plurality of subbands;
   associating said at least one SSG with said at least one CORESET, the associated CORESET becoming a reference CORESET;
   associating the reference CORESET and at least one frequency shifted CORESET of the reference CORESET confined within at least another subband (SB2, SB3) among the plurality of subbands, with said at least two different search space sets; the reference CORESET and the at least one frequency shifted CORESET sharing a same CORESET index (CORESET_ID 1);
   performing a listen before talk (LBT) procedure over each subband of the plurality of subbands to detect available subbands;
   transmitting, within available subbands, a control channel within the reference CORESET and the at least one frequency shifted CORESET.

2. The method for control channel transmission of claim 1, wherein the at least one frequency shifted CORESET is also time shifted and wherein the reference CORESET and the at least one frequency and time shifted CORESET shares the same CORESET index (CORESET_ID 1).

3. The method for control channel transmission of claim 1, wherein each search space set of the SSG configures monitoring occasion with a slot periodicity defining monitoring slots and at least one time location defining at least one monitoring starting time within said monitoring slots.

4. The method for control channel transmission of claim 3, wherein during the search space set configuration, an explicit indication of the CORESET frequency shift is provided.

5. The method for control channel transmission of claim 3, wherein during the search space set configuration, an implicit indication of the CORESET frequency shift is provided using a pre-defined index ordering of the different search space sets within said at least one search space group.

6. The method for control channel transmission of claim 1, further comprising the step of:
either configuring, when more than one subband is available, a restriction to one available subband containing the configured reference CORESET or one frequency shifted CORESET of the reference CORESET associated with the configured at least one search space group;
or configuring, when more than one subband is available, a restriction to at least one of the configured reference CORESET or one frequency shifted CORESET of the reference CORESET associated with the configured at least one search space group.

7. The method for control channel transmission of claim 1, wherein the CORESET are based on a control-channel element (CCE) index and a valid search space set is defined as a search space set which corresponding CORESET is in an available subband, the method further comprising the step of:
configuring, when the total number of CCE of the corresponding CORESET of valid search space sets exceeds a pre-defined threshold, to switch off some CCE from being monitored.

8. The method for control channel transmission of claim 1, further comprising the step of:
signalling the available subbands via an explicit indication within a control signal (GC-PDCCH).

9. The method for control channel transmission of claim 1, further comprising the steps of:
signalling the available subbands via an implicit indication through a transmission of a pre-known signal (DMRS).

10. A method for control channel detection m wideband operation containing a plurality of subbands, performed in a user equipment (UE), comprising the steps of:
monitoring at least one search space group associated with a reference control resource set (CORESET) confined in one subband among the plurality of subbands and containing at least two search space sets, by:
monitoring, within said one subband, one search space set of the search space group (SSG) containing the reference CORESET and
monitoring, within at least another subband, the at least another search space set of the SSG containing at least one frequency shifted CORESET of the reference CORESET confined m the at least another subband among the plurality of subbands;
the reference CORESET and the at least one frequency shifted CORESET sharing a same CORESET index (CORESET ID 1):
ignoring search space sets within unavailable subbands among the plurality of subbands after a listen before talk procedure has been performed by a base station over each subband of the wideband: and
detecting a control channel within the reference CORESET or the at least one frequency shifted CORESET.

11. The method for control channel detection of claim 10, wherein the at least one frequency shifted CORESET is also time shifted and wherein the reference CORESET and the at least one frequency and time shifted CORESET shares the same CORESET index (CORESET_ID 1).

12. The method for control channel detection of claim 10, wherein each search space set of the SSG configures monitoring occasion with a slot periodicity defining monitoring slots and at least one time location defining at least one monitoring starting time within said monitoring slots.

13. The method for control channel detection of claim 12, further comprising a step of:
detecting an explicit indication of the CORESET frequency shift.

14. The method for control channel detection of claim 12, further comprising a step of:
detecting an implicit indication of the CORESET frequency shift using a pre-defined index ordering of the different search space sets within said at least search space group.

15. The method for control channel detection of claim 10, wherein a valid search space set is defined as a search space set which corresponding CORESET is in an available subband, the method comprising the step of:
selecting one SSG containing at least one valid search space set,
wherein the selected SSG contains multiple valid search space sets, the method comprising the step of:
either selecting one valid search space set from the valid search space sets;
or selecting at least two of the valid search space sets.

16. The method for control channel detection of claim 15, comprising the step of:
detecting the selected valid search space set(s) either through an explicit indication in the RRC configuration or through an implicit indication of a pre-defined CCE index value.

17. The method for control channel detection of claim 15, wherein the base station configures a number of control channel candidates within each search space set of the SSG, the method comprising the step of:
selecting, within the valid search spaces, only search spaces which have monitoring occasion in a current slot, if the number of control channel candidates exceeds a pre-defined maximum number within each valid search space set.

18. The method for control channel detection of claim 15, wherein the base station configures a number of control channel candidates within each search space set of the SSG and wherein the CORESET are based on a control-channel element (CCE) index, the method comprising the step of:
selecting the CCEs within each of the corresponding CORESET to the valid search spaces having monitoring occasion in a current slot, if the number of non-overlapped CCEs exceeds a pre-defined maximum number.

19. The method for control channel detection of claim 17, wherein the number of control channel candidates within each search space set is based on at least one aggregation level of control channel elements, the method comprising the step of:
further selecting search spaces set by removing a largest aggregation level value and its corresponding control channel candidates for each search space set with more than one aggregation level value.

20. The method for control channel detection of claim 17, comprising the step of:
> further reducing the number of control channel candidates by picking only one valid search space with a number of control channel candidates lower than a pre-defined maximum number of candidates or by dividing the number of candidates for each search space by an integer value.

\* \* \* \* \*